(12) United States Patent
Manteufel et al.

(10) Patent No.: US 6,756,101 B2
(45) Date of Patent: Jun. 29, 2004

(54) TAPE FOR USE WITH HIGH-SPEED WEBS AND METHOD OF USE THEREOF

(75) Inventors: Todd Manteufel, Union Grove, WI (US); John Starkey, Waterford, WI (US)

(73) Assignee: Specialty Tapes, division of RSW, Franksville, WI (US)

( * ) Notice: Subject to any disclaimer, the term of this patent is extended or adjusted under 35 U.S.C. 154(b) by 0 days.

(21) Appl. No.: 10/159,469

(22) Filed: May 31, 2002

(65) Prior Publication Data

US 2003/0106629 A1 Jun. 12, 2003

(Under 37 CFR 1.47)

Related U.S. Application Data

(63) Continuation-in-part of application No. 09/906,439, filed on Jul. 16, 2001, now abandoned.

(51) Int. Cl.[7] .............................. B65H 69/06; B31F 5/06
(52) U.S. Cl. ...................... 428/41.7; 428/41.8; 428/343; 156/159; 156/187; 242/532.3
(58) Field of Search .............................. 156/159, 187, 156/502, 504; 242/532.3; 428/41.7, 41.8, 343

(56) References Cited

U.S. PATENT DOCUMENTS

| | | | |
|---|---|---|---|
| 3,321,149 A | * | 5/1967 | Andersen et al. ........... 242/583 |
| 4,379,012 A | | 4/1983 | Heymanns |
| 4,422,586 A | * | 12/1983 | Tetro ........................ 242/527.3 |
| 4,912,510 A | * | 3/1990 | Ogura et al. .................. 355/72 |
| 5,212,002 A | | 5/1993 | Madrzak et al. |
| 5,323,981 A | | 6/1994 | Dionne |
| 5,348,793 A | | 9/1994 | Stettner |
| 5,683,807 A | | 11/1997 | Roder et al. |
| 5,692,699 A | | 12/1997 | Weirauch et al. |
| 5,702,555 A | | 12/1997 | Caudal et al. |
| 5,901,919 A | | 5/1999 | Wienberg |
| 5,916,651 A | | 6/1999 | Wienberg et al. |
| 5,996,927 A | | 12/1999 | Wierauch et al. |
| 6,443,387 B1 | * | 9/2002 | Mercer et al. ........... 242/532.3 |
| 6,478,247 B2 | * | 11/2002 | Fujiwara et al. ......... 242/532.3 |

FOREIGN PATENT DOCUMENTS

WO    WO99/46196    * 9/1999

* cited by examiner

Primary Examiner—Mark A. Osele
(74) Attorney, Agent, or Firm—Jansson, Shupe & Munger, Ltd.

(57) ABSTRACT

An adhesive tape for use with high-speed webs which provides for adherence between two surfaces before allowing the tape to separate along a specific interface between two non-adhesive layers. The separation of tape along the specific interface results in the absence of any exposed adhesive surfaces and provides for improved performance in a variety of uses.

14 Claims, 8 Drawing Sheets

TAPE FOR USE WITH HIGH-SPEED WEBS AND METHOD OF USE THEREOF

RELATED APPLICATIONS

This is a continuation-in-part of patent application Ser. No. 09/906,439, filed on Jul. 16, 2001 by an inventor named herein, and now abandoned.

FIELD OF THE INVENTION

This invention relates generally to double-sided tapes and, in particular, to double-sided tapes for use with high speed webs.

BACKGROUND OF THE INVENTION

Web-splicing is a common process encountered in many industrial applications. The process is typically used in the printing or coating of paper or other substrates and other applications in the film and paper industry. These applications typically involve numerous web-splices, which are labor intensive and time consuming.

During the web-splicing process, the loose end or tail of a wound reel of material is adhered or otherwise attached to the web of reel already in use. Due to the depletion of the reel in use, a web-splice must be performed in order to allow for the continuation or the printing or coating application. In order to alleviate the time lost during the connection of the new reel to the depleted reel, it is known in the prior art to connect these reels while the printing or coating application is proceeding. This type of web-splice is referred to in the art as a flying reel splice.

Several problems are associated with flying reel splices. First, the loose end or tail of the new web must be kept in a tightly wound position on the reel, otherwise the reel could unwind. This problem was typically overcome in the prior art by placing tabs of adhesive tape over the loose end to adhere it to the reel. Typically, the adhesive tape was perforated along an axis where the tape was intended to break during the splice. This system required the reel handler to place the tabs onto the loose end individually, ensuring that the perforations were in line with the end of the reel. was contacted with the new reel, the double-sided tape adhered the two webs and the tabs separated along the perforations. This resulted in the presence of separated tabs on the loose end of the new reel and on the outer surface of the inner layer of the new reel. Due to the application and separation of the tabs, adhesive surfaces of the tab were exposed and could disrupt and damage the machinery of the industrial application. Even without exposure of adhesive, the presence of unadhered portions of tabs could disrupt and damage the machinery. In addition, air often entered into the reel between the tabs. The presence of air in the reel hinders the "bump" between the reels which results their adherence to each other. If air is trapped in the reel, adherence between the reels would be prevented. Thus, this prior art method of providing for high-speed web-splicing did not address all problems associated with the process.

Other prior art systems employed the use of adhesives with different adhesion strengths. For instance, a first adhesive was applied to adhere the inner surface of the loose end to the inner layer and a second adhesive was applied to the outer surface. The second adhesive was stronger than the first so that, upon application to the depleted reel, the second adhesive caused the loose end to adhere to the depleted reel and pull the first adhesive from the inner layer. This resulted in an exposed adhesive on either the inner surface of the loose end, the outer surface of the inner layer or both. Such exposed adhesive can disrupt and severely damage the expensive machinery involved in web handling.

U.S. Pat. No. 5,702,555 to Caudal attempted to overcome the problems of the prior art. It relates to a tape with a cleavable central component that separates when subjected to a peeling force greater than its internal bond strength. Caudal addresses the problem of trapped air since it teaches the application of the adhesive continuously across the loose end of the reel.

U.S. Pat. Nos. 5,901,919 and 5,916,651 to Wienberg utilize a similar structure to Caudal. These patents also involve the application of a tape across the end of the loose reel to prevent the trapping of air in the reel. Paper is used since the patents seek to provide an adhesive which can be used in repulpable applications. Separation of the tape also occurs along a zone in a cleavable layer.

While these patents addressed some of the problems of the prior art, they present additional problems. Specifically, each of these patents utilizes a cleavable paper layer in the adhesive tape which separates randomly through its middle zone so that portions of its top and bottom halves remain attached to the surrounding adhesive layers. The method of separation is simply applying a force greater than the cleavable layer's internal bond strength which causes the layer to split.

These systems assume that the paper can repeatedly split along its middle. However, in practice the paper often does not cleave so perfectly resulting in exposed adhesive and damage to the machinery. Furthermore, the paper-backed tape is not strong enough to use in high-speed web-splices due to the inherent strength limitation of paper and the preferred use of paper which will split along its middle when normal splice force is applied. In addition, the ragged surface of the cleaved paper layer may cause disruptions in, and damage to, the expensive web handling machinery. Finally, the paper layers involved in these patents accept and reject moisture, are susceptible to humidity and encounter storage problems when experiencing high temperatures. These factors can lead to curling and wrinkling of the reel and problems in web handling.

Thus, there is still a need for an effective web-splice tape which can perform high-speed web-splices with separation at a specific engineered interface and leave no exposed adhesive anywhere on the new or depleted reels so that damage to machinery is avoided. An improved high-speed web-splicing tape which attains these purposes would be an important advance in the art.

OBJECTS OF THE INVENTION

It is an object of the invention to provide a tape for use with high-speed web reels which releasably secures the loose end of a new reel to the new reel so that, upon attachment to a depleted reel, the tape separates along a specific engineered interface so no adhesive is exposed after the tape separates.

Another object of the invention is to provide a tape for use with high-speed web reels which releasably secures the wound end of the reel to the reel core so that, upon depletion of the reel, the tape separates along a specific engineered interface.

Another object of the invention is to provide a tape for use with high-speed web reels which releasably secures the wound end of the reel to the reel core so that, upon depletion of the reel, the tape separates along a specific engineered interface so that the web does not wind back onto the core.

Another object of the invention is to provide a tape for use with high-speed web reels which releasably secures the wound end of the reel to the reel core so that, upon depletion of the reel, the tape separates along a specific engineered interface so that no adhesive is exposed after the tape separates.

Another object of the invention is to provide a tape for use with high-speed web reels which releasably secures the wound end of the reel to the reel core so that, upon depletion of the reel, the tape separates along a specific engineered interface so that the reel does not exert tension on the web which may damage machinery through which the web passes.

Another object of the invention is to provide a tape for use with high-speed web reels which prevents damage to either reel or to the machinery involved in web handling.

Another object of the invention is to provide a thin tape which offers sufficient strength for use in high-speed web-splices.

Another object of the invention is to provide a tape for use with high-speed web reels which has a specific separation interface and separation force.

Another object of the invention is to provide a tape for use with high-speed web reels which splits into two smooth-surfaced parts after connection between web reels.

Yet another object of the invention is to provide a tape for use with high-speed web reels which allows for quick application to a reel and preparation for splicing.

Still another object of the invention is to provide a tape for use with high-speed web reels which is moisture, humidity and temperature resistant.

How these and other objects are accomplished will become apparent from the following descriptions and the drawings. In the brief summary of the invention which follows, numbers are added for explanatory purposes only and are in no way to be construed as limiting the elements and combinations of the invention to the particular forms referenced

BRIEF SUMMARY OF THE INVENTION

An embodiment of the new high-speed web-splicing tape and method of use thereof is intended to provide for reliable, efficient high-speed web-splicing requiring less labor, time and repair. The new high-speed web-splicing tape for use in high-speed flying reel splices between a reel (roll) of a depleted web and a reel (roll) of a new web, the new web having an outer layer (10) with an inner surface (10B) and an inner layer (11) with an outer surface (11A). The tape includes: a first adhesive (1) having top (1A) and bottom (1B) surfaces; a breakaway-coating (2) covering the top surface (1A); a release-coating (3) affixed to the breakaway-coating (2) along an interface; a substrate (4) having first (4A) and second (4B) surfaces, the second surface (4B) secured to the release-coating (3); and a second adhesive (5) having upper (5A) and lower (5B) surfaces, the lower surface (5B) adhered to the first surface (4A) and the upper surface (5A) having proximal (5C) and distal (5D) portions. The tape, having been adhered to the new web through adhesion of the bottom surface (1B) to the outer surface (11A) and adhesion of the proximal portion (5C) to the inner surface (10B) and having adhesive which is exposed at the distal portion (5D), separates along the interface of the release-coating (3) and breakaway-coating (2) when the distal portion (5D) is contacted and adhered to the depleted web, such that the first adhesive (1) and breakaway-coating (2) continue to adhere to the outer surface (11A) and the release-coating (3), substrate (4) and second adhesive (5) adhere to both the inner surface (10B) and the depleted web so that no adhesive is exposed after separation.

This embodiment of the new high-speed web-splicing tape for use in high-speed flying reel splices preferably further comprises a release-liner (6) adhering to the proximal (5C) and distal (5D) portions and having a mechanical weakness at the juncture of the proximal (5C) and distal (5D) portions to divide the release-liner (6) into first (6C) and second (6D) portions, such that the first portion (6C) can be removed to enable adhesion of the proximal portion (5C) to the inner surface (10B) before the second portion (6D) is removed to enable adhesion of the distal portion (5D) to the web of the depleted reel.

In another description of the novel tape for use with high-speed web reels, the tape comprises a first adhesive having top and bottom surfaces; a breakaway-coating covering the top surface; a release-coating affixed to the breakaway-coating along an interface; a substrate having first and second surfaces, the second surface secured to the release-coating; and a second adhesive having upper and lower surfaces. Such a construction allows the tape to separate along the interface of the release-coating and breakaway-coating when a force pulls the first adhesive from the second adhesive so that no adhesive is exposed after separation.

This tape may be provide for use during a flying reel splice between a reel of a depleted web and a reel of a new web. The new web includes an outer layer with an inner surface and an inner layer with an outer surface. The bottom surface of the first adhesive can be adhered to the outer surface of the inner layer and the upper surface of the second adhesive can be adhered to the inner surface of the outer layer.

The tape may also be provided for holding a reel of a web onto a core. The web has an innermost layer with an inner surface and the core has a outer surface. The bottom surface of the first adhesive can be adhered to the outer surface of the core and the upper surface of the second adhesive can be adhered to the inner surface of the innermost layer such that a force pulling the web from the core causes the tape to separate along the interface of the release-coating and breakaway-coating.

The tape may also include a release-liner adhering to the upper surface of the second adhesive such that the release-liner can be removed prior to use of the second adhesive.

The first adhesive is a pressure sensitive adhesive, preferably acrylic, silicone or rubber-based, and has a peel adhesion between about 80–125 oz/in, most preferably about 110 oz/in. The first adhesive has a preferably thickness between about 1–3.5 mils, most preferably about 2 mils. The first adhesive could be have other compositions as are known in the art as long as it retains a sufficient peel adhesion and resistance to environmental conditions.

The second adhesive is a pressure sensitive adhesive, preferably acrylic, silicone or rubber-based, and has a peel adhesion between about 125–175 oz/in, most preferably about 150 oz/in. The first adhesive has a preferably thickness between about 3.5–7.5 mils, most preferably about 5 mils. The second adhesive could have other compositions as are known in the art as long as it retains a sufficient peel adhesion and resistance to environmental conditions.

The adhesion force between the first adhesive and the breakaway-coating and the adhesion force between the second adhesive and the release-coating must be great enough to allow the breakaway-coating to separate from the release-coating when separation forces are applied. The propensity of the breakaway-coating and release-coating to remain affixed to one another must also be small enough to allow the force of the reel splice affect separation along the interface between these coatings.

The substrate upon which the release-coating is secured is preferably polyester, or another polymeric film. It has a thickness of preferably between about 0.5–2 mils, most preferably 1 mil.

In the first embodiment, the mechanical weakness in the release liner is preferably a continuous slit, though it could be a series of slits or perforations.

The tape is preferably constructed by first coating the substrate with the release-coating. After the release-coating is in place, the breakaway-coating can be applied to it. This application process is not critical to the invention, however it is understood that no adhesive is utilized to secure the breakaway-coating to the release-coating. After the substrate, release-coating and breakaway-coating are secured to one another, the first and second adhesive layers can be applied. Typically, the second adhesive is applied to the breakaway-coating by contacting the second adhesive as a layer with the release liner backing onto the breakaway-coating. The first adhesive can be applied as a layer which contacts the release-coating or as a liquid.

One embodiment of the method of this invention involves using such novel tape to splice a reel of a new web to a reel of a depleted web which is rotating at a high speed, the new web having an outer layer (10) with an inner surface (1B) and a distal end (12) and an inner layer (11) with an outer surface (11A). The method includes the steps of: applying the bottom surface (1B) to the outer surface (11A); removing the first portion (6C) and applying the proximal portion (5C) to the inner surface (10B) along a desired adhesion junction; cutting the distal end (12) of the outer layer (10) near the junction such that the outer layer (10) does not extend substantially beyond the proximal portion (5C); removing the second portion (6D); and contacting the depleted web to the new web so that the depleted web adheres to the distal portion (5D) and causes the tape to split along the interface such that no adhesive surface is exposed.

This method preferably also includes the step of rotating the new reel at a high speed substantially similar to the speed of the depleted reel before contacting the depleted web to the new web. The speed of rotation of the depleted reel is preferably higher than about 750 ft/min, and may be substantially higher than about 750 ft/min. The method preferably also comprises the steps of folding back the outer layer (10) to expose the outer surface (11A) before adhering the bottom surface (1B) to the outer surface (11A); and smoothing the outer layer (10) over the proximal portion (5C) to adhere the proximal portion (5C) to the inner surface (10B).

The bottom surface (1B) is adhered to the outer surface (11A) along an elongate area, preferably an area which is substantially linear and perpendicular to the direction of the web when winding/unwinding the reel, and the desired adhesion junction is located on the inner surface (10B) directly adjacent to the elongate area when the outer layer (10) is wound tightly around the inner layer (11).

A second embodiment of the method of this invention involves using such novel tape to splice a reel of a new web to a reel of a depleted web which is rotating at a high speed, the new web having an outer layer (10) with an inner surface (10B) and an opposite surface (10C) and a distal end (12), and an inner layer (11) with an outer surface (11A). The method includes the steps of: adhering the bottom surface (1B) to the outer surface (11A); removing the release liner (6); adhering the upper surface (5A) to the inner surface (10B); providing an adhering element (13) on the opposite surface (10C); and contacting the depleted web to the new web so that the depleted web adheres to the adhering element (13) and causes the tape to split along the interface such that no adhesive surface is exposed. These steps may be performed in many different orders so long as the tape is properly positioned on the new web before contact with the depleted web.

The second embodiment may further comprise the steps of: folding back the outer layer to expose the outer surface before adhering the bottom surface to the outer surface, and smoothing the outer layer over the proximal portion to adhere the proximal portion to the inner surface.

The second embodiment may further comprise the step of rotating the new reel at a high speed substantially similar to the speed of the depleted reel before contacting the depleted web to the new web. The second embodiment may also further comprise the step of positioning holding tape over the distal end to keep the outer layer from unintentionally separating from the inner layer.

The tape in each of the first two embodiments is intended for use in machinery which automatically connects a new reel to a depleted reel. Such machinery typically includes multiple turrets which hold the reels. A first turret is positioned to hold the reel in use. When it becomes depleted, a second turret holding a new reel moves into position to contact the web of the depleted reel to the new reel. The new reel may be propelled to rotate at substantially the same rate as the depleted reel, or it may be stationary.

The second turret moves the new reel into the depleted reel so that they "bump." Upon bumping, the new reel is adhered to the depleted reel and the tape separates along the interface between the breakaway-coating and the release-coating so that the new reel is able to unwind. After the connection between the new reel and the depleted reel, the machinery cuts or otherwise stops the depleted reel from supplying web. The first turret moves out of its position to allow an operator to remove the depleted web and replace it with another reel.

A third embodiment of the method of this invention involves using such novel tape to releasably adhere a reel of a web to a core, the web (17) having an innermost layer (16) with an inner surface (16B) and the core (14) having a outer surface (14A), comprising the steps of: adhering the bottom surface (1B) to the outer surface of the core; removing the release-liner (6); and adhering the upper surface (5A) to the inner surface (16B) of the innermost layer (16), such that the tape splits along the interface when the reel is depleted and the web is pulled from the core. In this embodiment, the upper surface may be adhered to the inner surface before the bottom surface is adhered to the outer surface.

This embodiment preferably results in no adhesive surface being exposed after the tape splits, but more preferably prevents the core from beginning to wind the web back onto the core, and most preferably eliminates tension on the web when the reel is depleted due to the designed separation of the tape.

DETAILED DESCRIPTIONS OF PREFERRED EMBODIMENTS

Figure 1A:
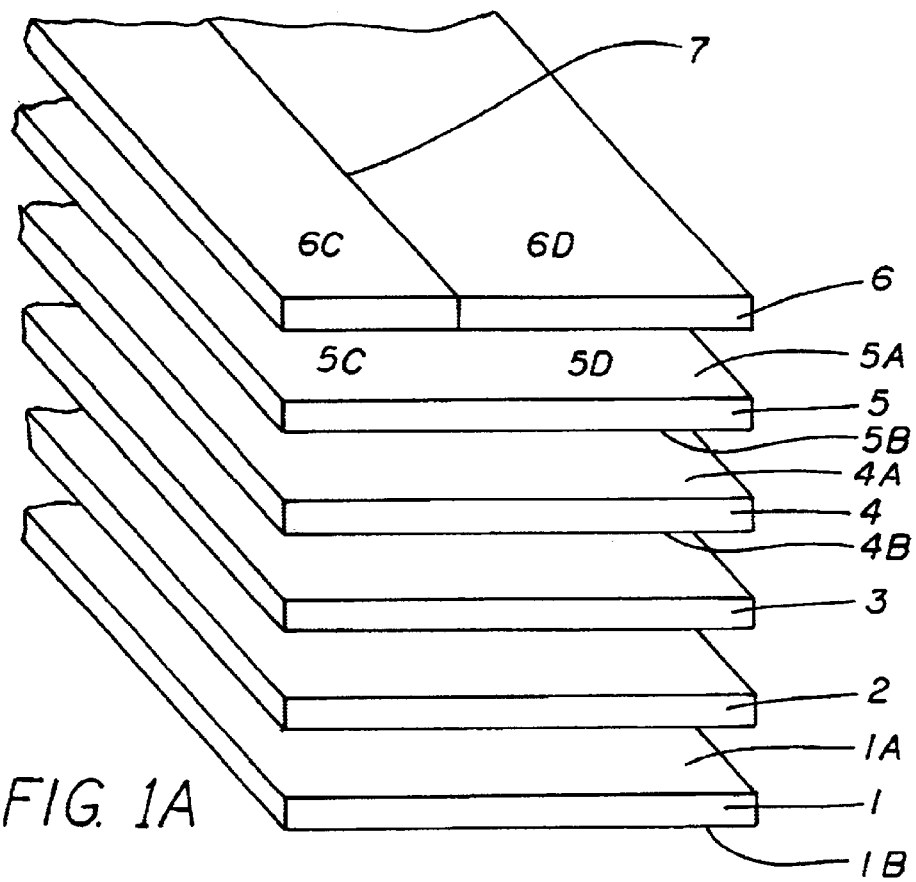
FIGS. 1A and 1B are cross sectional views of a tape for use with high speed webs according to the invention.

Referring to the figures, details of the tape for use with high-speed web reels and method of use will be set forth. FIGS. 1A–1B and 4A–4B depict a cross sectional view of alternate embodiments of the novel tape. First adhesive 1 has a bottom surface 1B and top surface 1A. Top surface 1A is covered by breakaway-coating 2. Release-coating 3 is affixed to breakaway-coating 2 along an interface 2A. Substrate 4 has a first surface 4A and a second surface 4B and is secured to release-coating 3 along second surface 4B. Second adhesive 5 has an upper surface 5A and a lower surface 5B which is adhered to first surface 4A of substrate 4. Upper surface 5A is adhered to release liner 6.

Figure 1B:
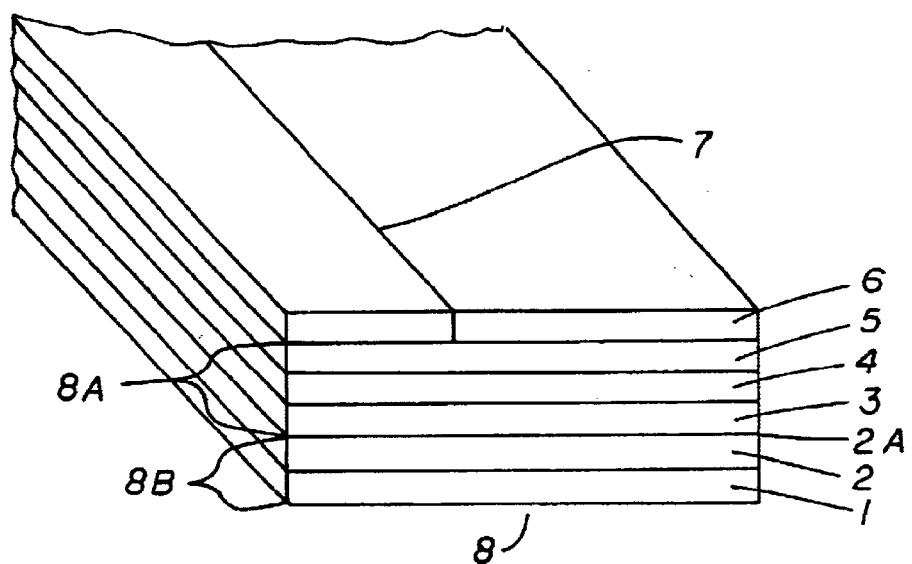
Figure 4A:
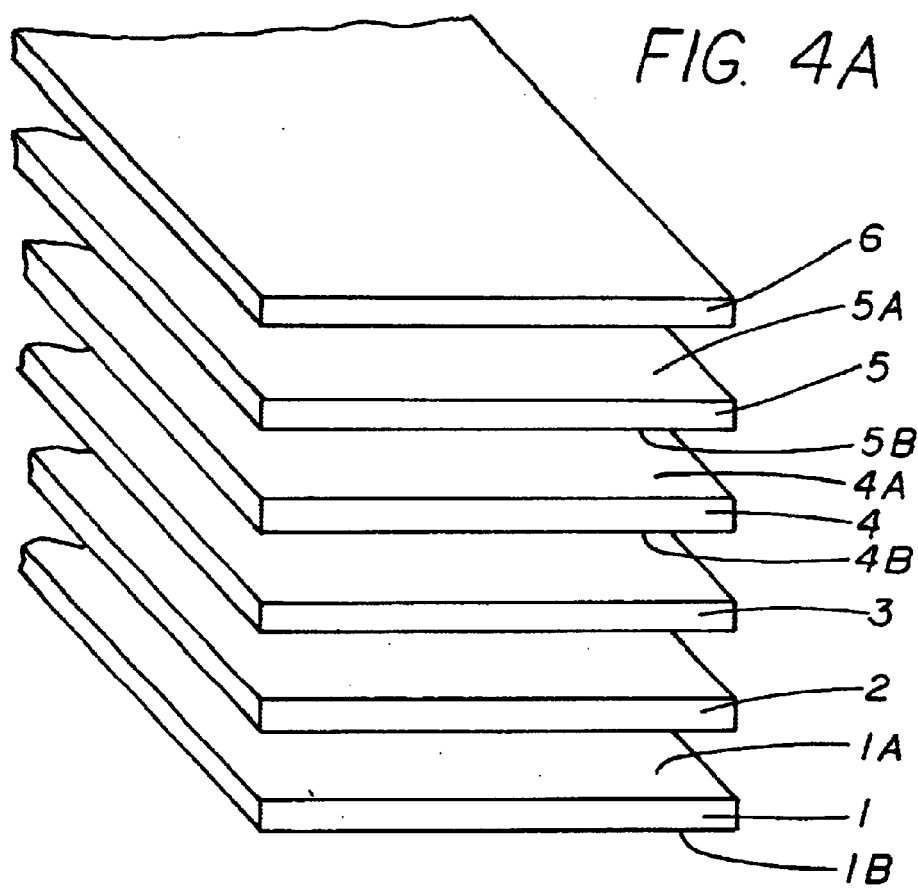
FIGS. 4A and 4B are cross sectional view of a tape for use with high speed webs according to the invention.
Figure 4B:
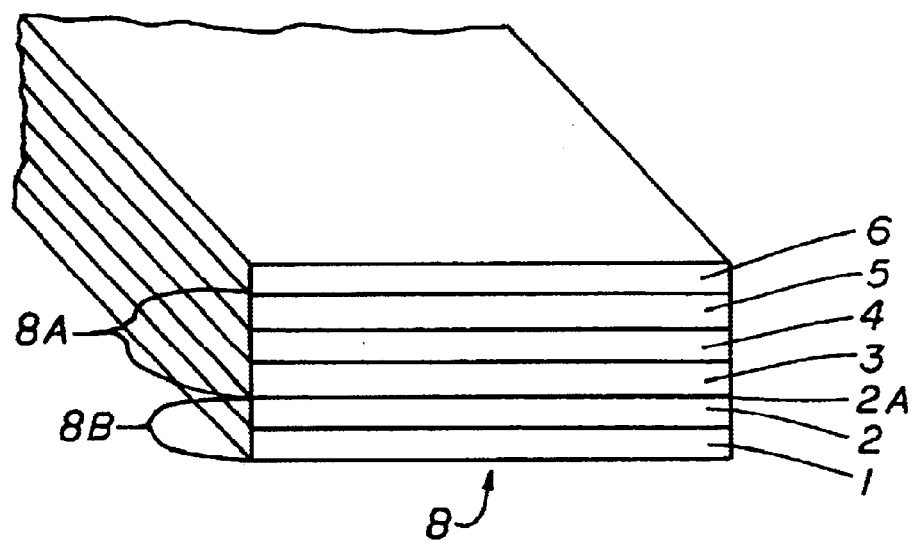

In FIGS. 1A and 1B the release liner 6 is shown having a mechanical weakness 7 which is slit running parallel to the edges of the tape. Mechanical weakness 7 divides release liner 6 into first portion 6C and second portion 6D. First portion 6C is secured to proximal portion 5C of second adhesive 5. Second portion 6D is secured to distal portion 5D of second adhesive 5. In FIGS. 4A and 4B release liner 6 is shown as a solid, un-slit piece which covers upper surface 5A of second adhesive 5.

First adhesive 1 and breakaway-coating 2 comprise the lower part 8B of tape 8. Second adhesive 5, substrate 4 and release-coating 3 comprise the upper part 8A of tape 8.

During application according to the first embodiment bottom surface 1B is applied to the outer surface of an inner layer of a reel. Then first portion 6C is removed from the tape and the outer layer of the reel is pulled taut and smoothed down over the tape affecting adhesion to proximal portion 5C. The excess web which extends beyond proximal portion 5C is trimmed so that second portion 6D is substantially exposed. The reel can be stored in this condition.

When ready for reel splicing, the reel is positioned and second portion 6D is removed, exposing distal portion 5D. Distal portion 5D is contacted to a depleted reel and adheres thereto. As the reel begins to unwind, separation occurs between breakaway-coating 2 and release-coating 3 such that first adhesive 1 and breakaway-coating 2 remained adhered to the outer surface of an inner layer leaving no adhesive exposed. Second adhesive 5, substrate 4 and release-coating 3 remain adhered to the outer layer of the reel and to the end of the depleted reel leaving no adhesive exposed.

Figure 2:
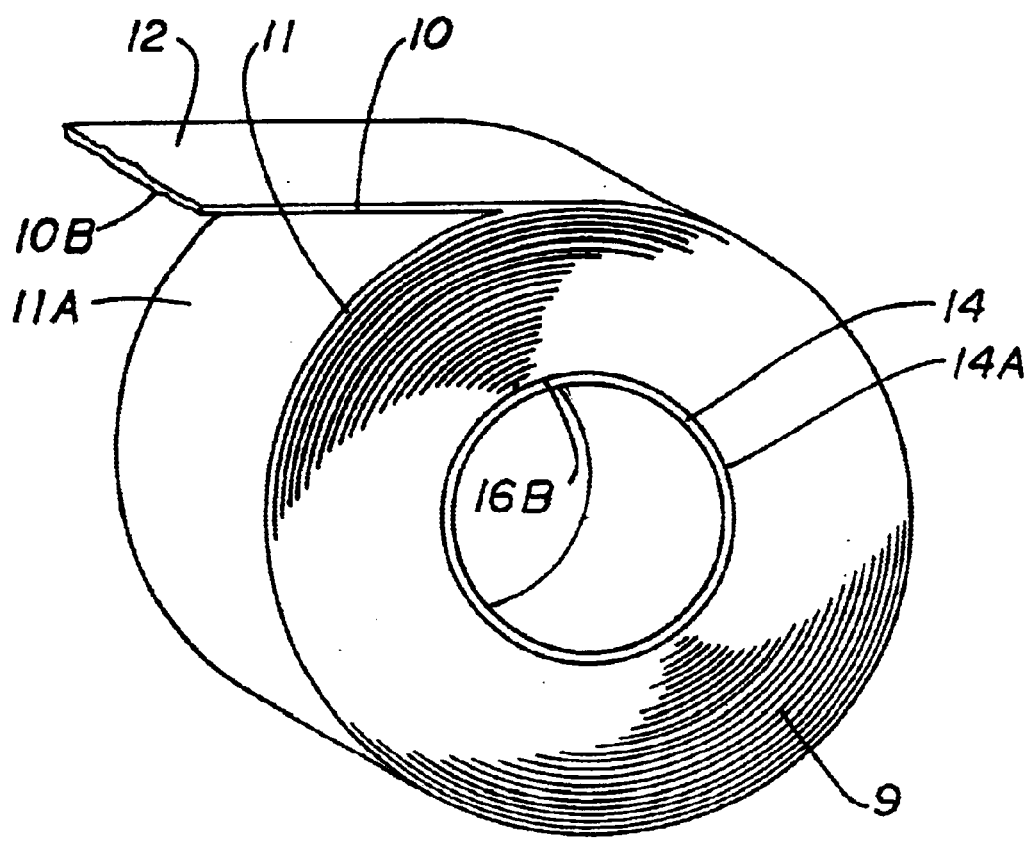
FIG. 2 shows the new reel of web utilized in the invention.

FIG. 2 depicts a new reel of web 9. Outer layer 10 has an inner surface 10B and inner layer 11 has an outer surface 11A. These surfaces are adhered to each other in order to prevent unwinding of the reel. In order to adhere the tape to outer surface 11A of inner layer 11, the end 12 of outer layer 10 is preferably folded back. Then the bottom surface of the tape is applied to outer surface 11A. Then the first portion of the release liner is removed and the proximal portion of second adhesive is exposed. After the proximal portion of second adhesive is exposed, outer layer 10 is pulled taut and wound back onto inner layer 11 affecting adhesion between outer layer 10 and the proximal portion of second adhesive.

Figure 3A:
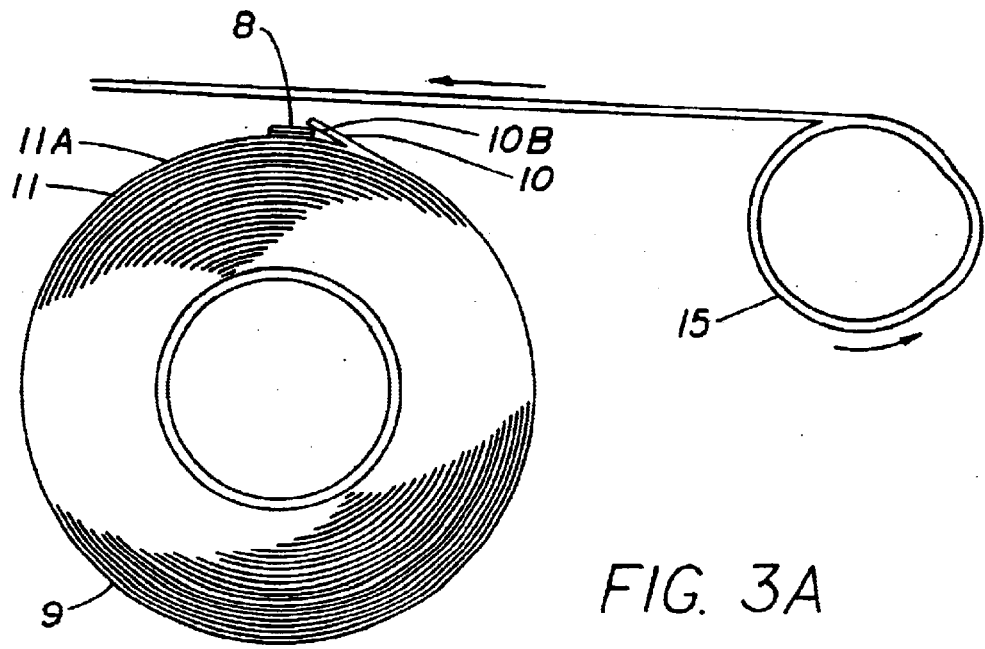
FIGS. 3A through 3D show a web-splice according to the invention.

FIGS. 3A–3D show the web-splice process of the first embodiment. FIG. 3A depicts the new reel 9 with outer layer 10 having a inner side 10B adhered to outer surface 11A of inner layer 11 via tape 8. Depleted reel 15 is feeding its web to machinery (not depicted). New reel 9 may or may not be rotating at substantially the same rate as depleted reel 15.

Figure 3B:
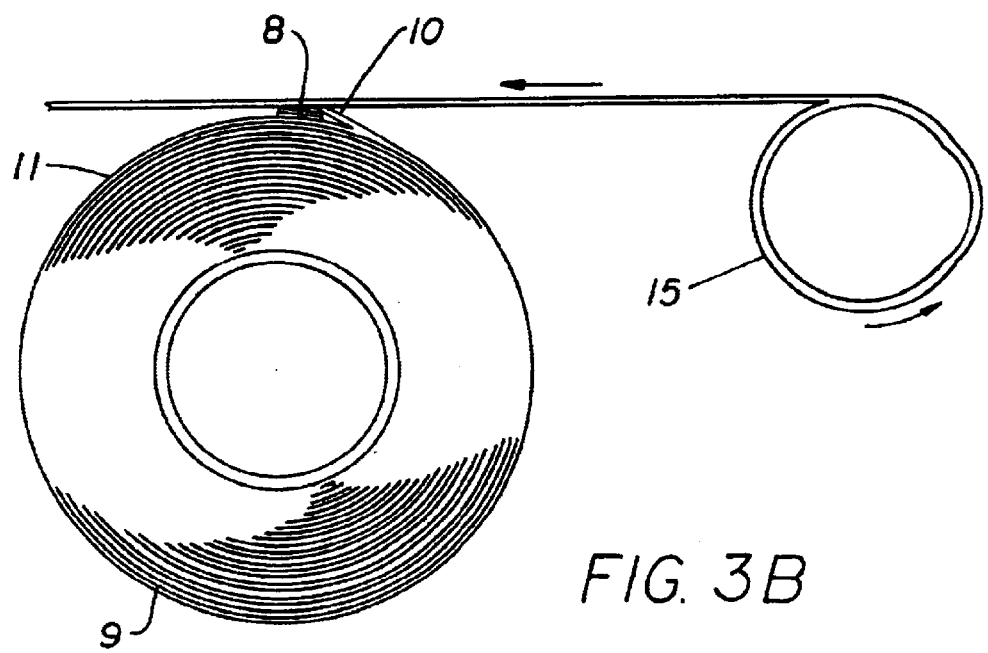

FIG. 3B shows the contact of new reel 9 to depleted reel 15. At the moment of contact, tape 8 adheres outer layer 10 to inner layer 11, outer layer 10 to depleted reel 15 and inner layer 11 to depleted reel 15. When contact has been made new reel 9 will rotate at the same rate as depleted reel 15. Outer layer 10 will travel with the web of depleted reel 15. The force pulling outer layer 10 with depleted reel 15 causes the tape 8 to separate along the interface between the breakaway-coating and the release-coating into upper and lower parts.

Figure 3C:
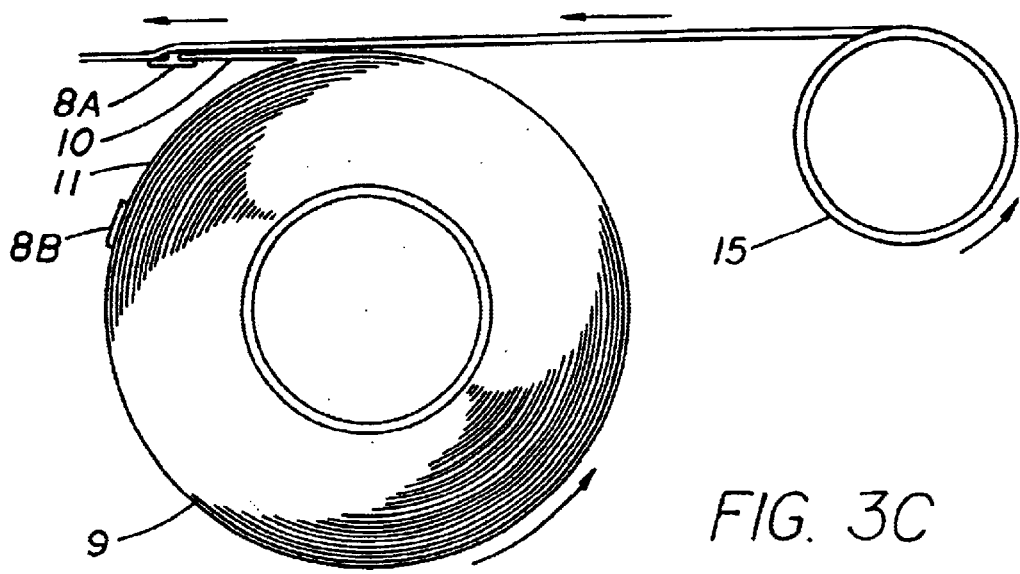

FIG. 3C shows new reel 9 being pulled with depleted reel 15 after contact and separation of the tape. The lower part of tape 8B includes the first adhesive and breakaway-coating and remains adhered to the outer surface of the inner layer 11. The upper part of tape 8A includes the second adhesive, substrate and release-coating and connects the end of outer layer 10 to the web of depleted reel 15. There is no exposed adhesive anywhere on either reel.

Figure 3D:
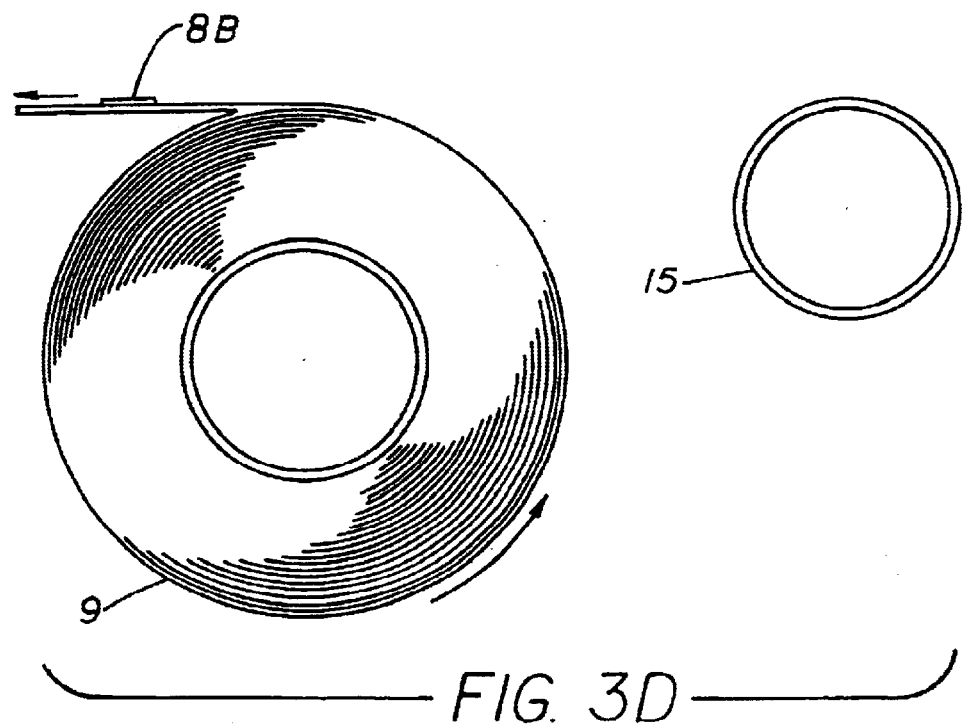

FIG. 3D shows the new reel 9 supplying its web to machinery (not shown) after the web of the depleted reel 15 has been cut or otherwise stopped from supplying its web. Lower part of tape 8B is depicted as passing along the web. Lower part of tape 8B has no exposed adhesive.

Figure 5A:
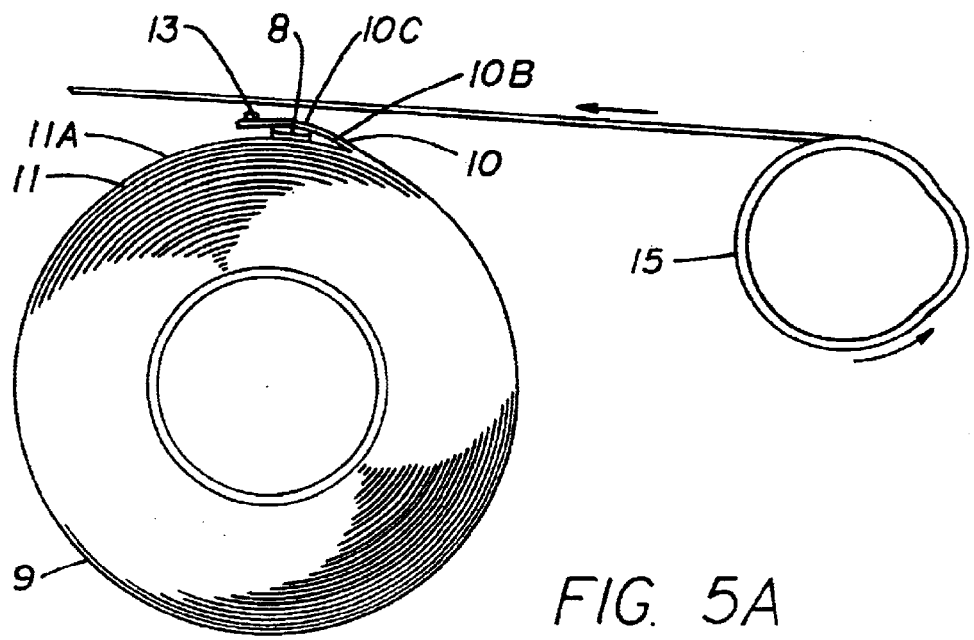
FIGS. 5A through 5D show a web-splice according to the preferred method.

FIGS. 5A–5D show the web-splice process according to the second embodiment. FIG. 5A depicts the new reel 9 with outer layer 10 having a inner side 10B adhered to outer surface 11A of inner layer 11 via tape 8. An adhering element 13 is positioned on opposite side 10C. Depleted reel 15 is feeding its web to machinery (not depicted). New reel 9 may or may not be rotating at substantially the same rate as depleted reel 15.

Figure 5B:
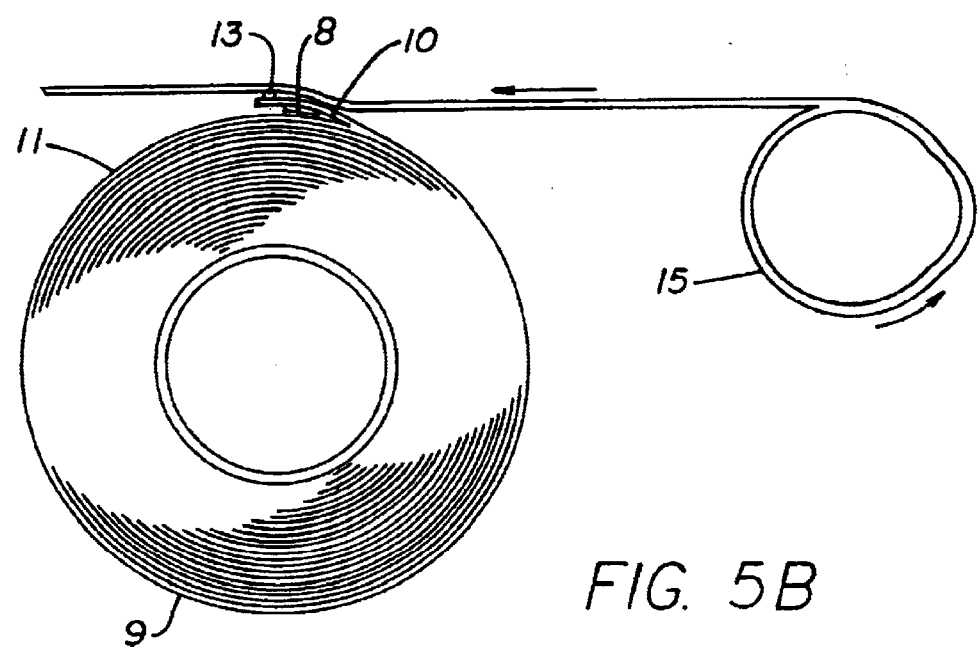

FIG. 5B shows the contact of new reel 9 to depleted reel 15. At the moment of contact, tape 8 adheres outer layer 10 to inner layer 11 and adhering element 13 adheres outer layer 10 to web of depleting reel 15. When contact has been made new reel 9 will rotate at the same rate as depleted reel 15. Outer layer 10 will travel with the web of depleted reel 15. The force pulling outer layer 10 with depleted reel 15 causes the tape 8 to separate along the interface between the breakaway-coating and the release-coating into upper and lower parts.

Figure 5C:
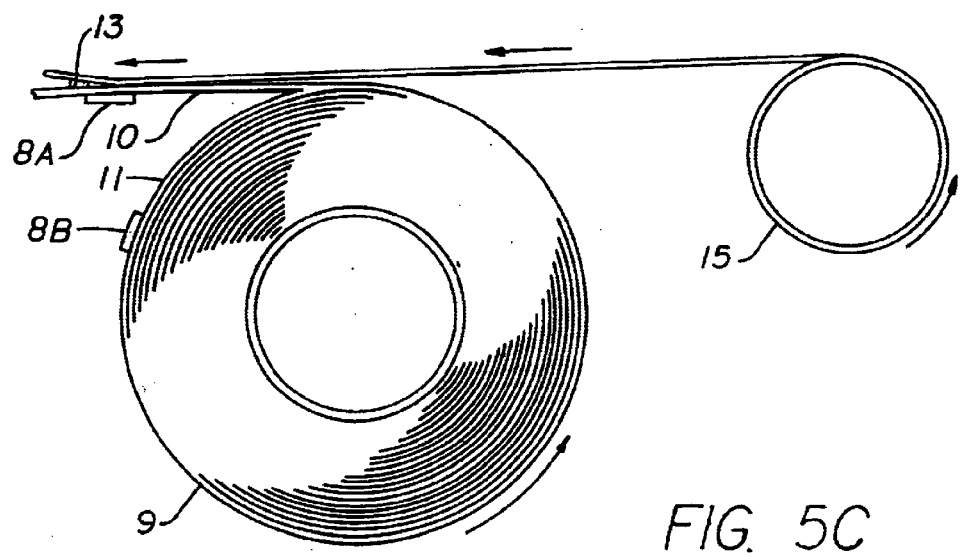

FIG. 5C shows new reel 9 being pulled with depleted reel 15 after contact and separation of the tape. The lower part of tape 8B includes the first adhesive and breakaway-coating and remains adhered to the outer surface of the inner layer 11. The upper part of tape 8A includes the second adhesive, substrate and release-coating. Adhering element 13 connects the end of outer layer 10 to the web of depleted reel 15. There is no exposed adhesive anywhere on either reel.

Figure 5D:
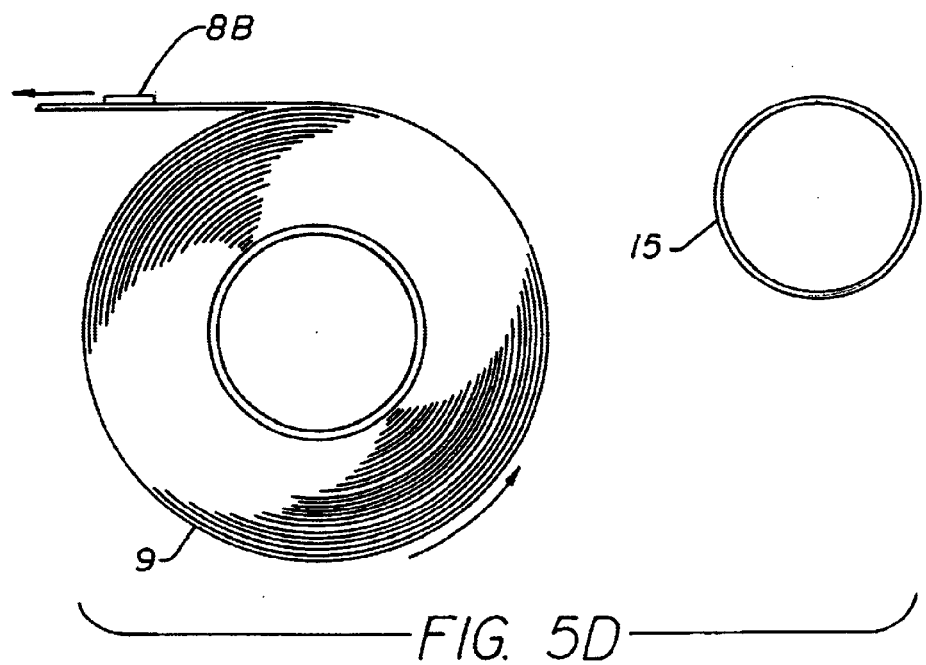

FIG. 5D shows the new reel 9 supplying its web to machinery (not shown) after the web of the depleted reel 15 has been cut or otherwise stopped from supplying its web. Lower part of tape 8B is depicted as passing along the web. Lower part of tape 8B has no exposed adhesive.

Figure 6:
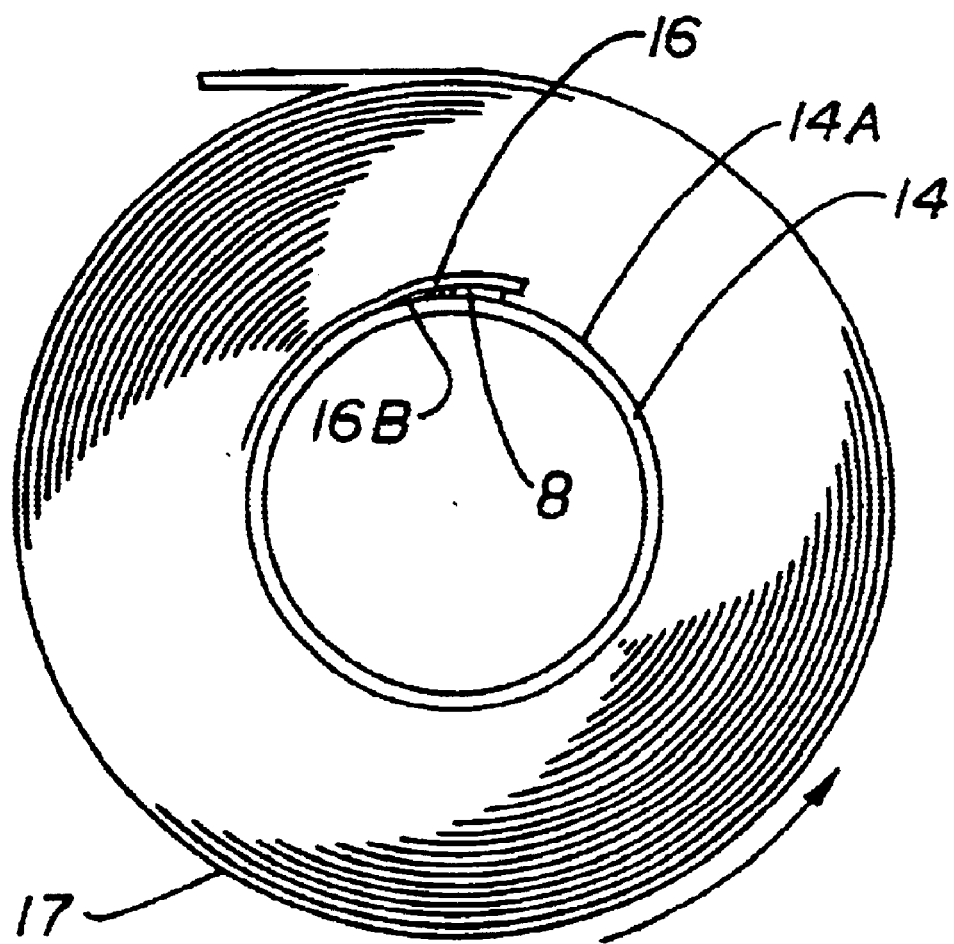
FIG. 6 shows the tape for use with high speed webs holding a web to a core according to the invention.

FIG. 6 depicts the method of releasably adhering a reel 17 of a web to a core 14 in accordance with the third embodiment. Core 14 includes an outer surface 14A around which the web is wound. Innermost layer 16 of web contacts outer surface 14A and is adhered thereto via tape 8. Specifically bottom surface 1B of first adhesive 1 is adhered to outer surface 14A of core 14 and upper surface 5A of second adhesive 5 is adhered to inner surface 16B of innermost layer 16. When reel 17 is depleted and innermost layer 16 is pulled from core 14, tape 8 will separate as discussed above such that no undue tension is placed on the reel machinery and the web of reel 17 does not rewind back upon core 14. In addition, no adhesive is exposed when tape 8 splits.

While the principles of the invention have been shown and described in connection with a limited number of embodiments, it is to be understood clearly that such embodiments are by way of example and are not limiting.

What is claimed is:

1. A tape for use with high-speed web reels, the tape comprising:
   a first adhesive having top and bottom surfaces;
   a breakaway-coating covering the top surface;
   a release-coating affixed to the breakaway-coating along an interface;
   a substrate having first and second surfaces, the second surface secured to the release-coating; and
   a second adhesive having upper and lower surfaces;
   whereby the tape is provided for holding a reel of a web onto a core, the web having an innermost layer with an inner surface and the core having an outer surface, and wherein the bottom surface of the first adhesive can be adhered to the outer surface of the core and the upper surface of the second adhesive can be adhered to the inner surface of the innermost layer so that a force pulling the web from the core causes the tape to separate along the interface of the release-coating and breakaway-coating so that no adhesive is exposed after separation.

2. The tape of claim 1 further comprising a release-liner adhering to the upper surface of the second adhesive such that the release-liner can be removed prior to use of the second adhesive.

3. The tape of claim 1 wherein the first adhesive is comprised of a pressure sensitive adhesive having a thickness of about 2 mils.

4. The tape of claim 1 wherein the substrate is polyester having a thickness of about 1 mil.

5. The tape of claim 1 wherein the second adhesive is comprised of a pressure sensitive adhesive having a thickness of about 5 mils.

6. A method of splicing a reel of a new web to a reel of a depleted web which is rotating at a high speed, the new web having an outer layer with an inner surface and an opposite surface and a distal end and an inner layer with an outer surface, comprising the steps of:
   utilizing a tape for use with high-speed web reels, the tape comprising:
      a first adhesive having top and bottom surfaces;
      a breakaway-coating covering the top surface;
      a release-coating affixed to the breakaway-coating along an interface;
      a substrate having first and second surfaces, the second surface secured to the release-coating;
      a second adhesive having upper and lower surfaces, the lower surface adhered to the first surface; and
      a release-liner adhering to the upper surface;
   adhering the bottom surface to the outer surface;
   removing the release-liner;
   adhering the upper surface to the inner surface;
   positioning holding tape over the distal end to keep the outer layer from unintentionally separating from the inner layer;
   providing a adhering element on the opposite surface; and
   contacting the depleted web to the new web so that the depleted web adheres to the adhering element and causes the tape to split along the interface such that no adhesive surface is exposed.

7. The method of claim 6 further comprising the steps of:
   folding back the outer layer to expose the outer surface before adhering the bottom surface to the outer surface; and
   smoothing the outer layer over the proximal portion to adhere the proximal portion to the inner surface.

8. The method of claim 6 further comprising the step of rotating the new reel at a high speed substantially similar to the speed of the depleted reel before contacting the depleted web to the new web.

9. The method of claim 6 wherein the upper surface is adhered to the inner surface before the bottom surface is adhered to outer surface.

10. A method of releasably adhering a reel of a web to a core, the web having an innermost layer with an inner surface and the core having a outer surface, comprising the steps of:
    utilizing a tape for use with high-speed web reels, the tape comprising:
       a first adhesive having top and bottom surfaces;
       a breakaway-coating covering the top surface;
       a release-coating affixed to the breakaway-coating along an interface;
       a substrate having first and second surfaces, the second surface secured to the release-coating;
       a second adhesive having upper and lower surfaces, the lower surface adhered to the first surface; and
       a release-liner adhering to the upper surface;
    adhering the bottom surface to the outer surface of the core;
    removing the release-liner; and
    adhering the upper surface to the inner surface of the innermost layer;
    whereby the tape splits along the interface when the reel is depleted and the web is pulled from the core.

11. The method of claim 10 wherein the upper surface is adhered to the inner surface before the bottom surface is adhered to the outer surface.

12. The method of claim 10 wherein no adhesive surface is exposed after the tape splits.

13. The method of claim 10 wherein the tape splits so that the core does not begin to wind the web back onto the core.

14. The method of claim 10 wherein the tape eliminates tension on the web when the reel is depleted.

* * * * *

UNITED STATES PATENT AND TRADEMARK OFFICE
CERTIFICATE OF CORRECTION

PATENT NO. : 6,756,101 B2
DATED : June 29, 2004
INVENTOR(S) : Manteufel et al.

It is certified that error appears in the above-identified patent and that said Letters Patent is hereby corrected as shown below:

Column 1,
Line 42, after "reel." add -- In order to attach the new reel to the depleted reel, typically double-sided adhesive was applied to the outer surface of the outer layer. When the depleted reel --.

Column 3,
Line 38, after "referenced" add -- . --.

Column 4,
Line 28, delete "provide" and substitute therefor -- provided --.
Line 38, delete "a" and substitute therefor -- an --.
Line 51, delete "preferably" and substitute therefor -- preferable --.
Line 53, delete "be".
Line 59, delete "preferably" and substitute therefor -- preferable --.

Column 5,
Line 30, delete "(1B)" and substitute therefor -- (10B) --.

Column 6,
Line 46, delete "a" and substitute therefor -- an --.

Column 7,
Line 1, delete "view" and substitute therefor -- views --.

Column 8,
Line 30, delete "a" and substitute therefor -- an --.

Signed and Sealed this

Tenth Day of May, 2005

JON W. DUDAS
*Director of the United States Patent and Trademark Office*